(12) United States Patent
Yamamoto

(10) Patent No.: US 9,419,402 B2
(45) Date of Patent: Aug. 16, 2016

(54) MAGNETIC SENSOR AND METHOD OF MANUFACTURING A TERMINAL

(71) Applicant: SUMITOMO WIRING SYSTEMS, LTD., Yokkaichi, Mie (JP)

(72) Inventor: Hironobu Yamamoto, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 458 days.

(21) Appl. No.: 14/065,853

(22) Filed: Oct. 29, 2013

(65) Prior Publication Data

US 2014/0187106 A1     Jul. 3, 2014

(30) Foreign Application Priority Data

Dec. 28, 2012 (JP) .................. 2012-288736

(51) Int. Cl.
  *H01R 43/16*     (2006.01)
  *G01D 5/14*      (2006.01)
  *G01D 11/24*     (2006.01)

(52) U.S. Cl.
  CPC .............. *H01R 43/16* (2013.01); *G01D 5/145* (2013.01); *G01D 11/245* (2013.01); *Y10T 29/49204* (2015.01)

(58) Field of Classification Search
  CPC .... H01R 13/6315; H01R 43/16; H01R 12/57; H01R 23/722; H01R 9/096; H01R 13/24; H01R 23/2407; H01R 43/20
  See application file for complete search history.

(56) References Cited

U.S. PATENT DOCUMENTS

| | | | | |
|---|---|---|---|---|
| 3,864,000 A | * | 2/1975 | Coller | H01R 12/716 439/246 |
| 6,939,154 B2 | * | 9/2005 | Horikoshi | G11B 33/08 439/247 |
| 7,210,945 B1 | * | 5/2007 | Ying | H01R 13/502 439/79 |
| 7,862,343 B1 | * | 1/2011 | Lin | H01R 13/2421 439/66 |
| 8,052,454 B2 | * | 11/2011 | Polnyi | H01R 12/57 439/342 |
| 8,475,179 B2 | * | 7/2013 | Lin | H01R 12/7082 439/66 |
| 2006/0172563 A1 | * | 8/2006 | Soh | H01R 13/2442 439/66 |
| 2006/0281346 A1 | * | 12/2006 | Pan | H01R 12/727 439/79 |
| 2009/0181560 A1 | * | 7/2009 | Cherian | G01R 1/0466 439/66 |

FOREIGN PATENT DOCUMENTS

JP    A-2008-268016    11/2008

* cited by examiner

*Primary Examiner* — Gary Paumen
(74) *Attorney, Agent, or Firm* — Oliff PLC

(57) ABSTRACT

A magnetic sensor, in which ends of an output side of two terminals can be arranged at a desired position regardless of a position of a magnetoelectric converter and which can easily be manufactured at a reduced cost, and a method of manufacturing two terminals used for the magnetic sensor. From two terminals aligned in a direction perpendicular to a longitudinal direction, a magnetic sensor outputs an electric signal converted by a magnetoelectric converter. Two terminals are provided with bent portions. A ridge line of each of the bent portions of one terminal is positioned on an extended line of a respective one of the ridge lines of the bent portions of the other terminal. In the terminals, a direction in which some ends are aligned is different from a direction in which other ends are aligned.

7 Claims, 6 Drawing Sheets

MAGNETIC SENSOR AND METHOD OF MANUFACTURING A TERMINAL

BACKGROUND

Vehicles have become popular that use systems such as an ABS (Antilock Brake System) that controls a brake according to a rotation speed for each wheel. In such a vehicle, a magnetic sensor is used to detect the rotation speed for a wheel (for example, see Japanese Pub. Patent App. 2008-268016).

In the magnetic sensor described in Japanese Pub. Patent App. 2008-268016, a plate-shaped magnetoelectric converter and two leads connected to the magnetoelectric converter are arranged in a cylindrical holder with a bottom. The holder is filled with resin when the magnetoelectric converter and the leads are arranged therein.

The magnetoelectric converter is structured so as to be positioned at one end of the holder, converts a magnetic field that permeates a plate surface of the magnetoelectric converter to an electric signal according to the strength of the magnetic field, and outputs the converted electric signal via the two leads.

The magnetic sensor described in Japanese Pub. Patent App. 2008-268016 is used to detect a rotation speed of an annular-shaped magnetic encoder that rotates along with a wheel in which S-polarity magnets and N-polarity magnets are alternatingly aligned in a circumferential direction. It is arranged in the vicinity of the magnetic encoder.

If the magnetic encoder is rotated by the wheel, the strength of the magnetic field in the vicinity of the magnetic sensor described in Japanese Pub. Patent App. 2008-268016, in other words the magnetic field that permeates the magnetoelectric converter, fluctuates. At this time, an electric signal that corresponds to the strength of the magnetic field that permeates the magnetoelectric converter, in other words to the rotation speed of the wheel, is output from the magnetoelectric converter via the two leads, and the rotation speed of the wheel is detected based on the output electric signal.

SUMMARY

There is a magnetic sensor that outputs an electric signal converted by a magnetoelectric converter from two terminals that are rectangular-plate-shaped and are connected to the magnetoelectric converter via two leads, respectively. In the two terminals provided by this magnetic sensor, ends that output an electric signal protrude from a holder whose inside is filled with resin. An on-board device is connected to the ends on an output side in each of the two terminals, and it detects a rotation speed of a wheel based on the electric signal output from the two terminals to which it is connected.

Depending on the vehicle type, the position within the wheel at which the on-board device connected to the two terminals of the magnetic sensor for detecting a rotation speed of the wheel is arranged with respect to the wheel varies. Because of this variation, a magnetic sensor is needed in which the position of the output-side ends of the two terminals with respect to the position of the magnetoelectric converter can be flexibly changed, such that the on-board device and the two terminals can be easily connected to each other regardless of the vehicle type.

However, in some magnetic sensors, the position of the output-side ends of the two terminals with respect to the position of the magnetoelectric converter is fixed. So there is a problem that the vehicles to which the sensor can be mounted are limited.

Given the above-mentioned situation, an embodiment of this invention provides a magnetic sensor in which output-side ends of two terminals can be arranged at a desired position regardless of the position of the magnetoelectric converter and that can be easily manufactured at a reduced cost. An embodiment of this invention also provides a method of manufacturing two terminals used for the magnetic sensor.

In the magnetic sensor in which an electric signal converted by a magnetoelectric converter is output from two terminals aligned in a direction perpendicular to a longitudinal direction, each of the two terminals has a plurality of bent portions. A ridge line of each of the plurality of bent portions of one terminal is positioned on an extended line of a respective one of the ridge lines of the plurality of bent portions of the other terminal. Finally, a direction in which ends of the two terminals are aligned at one side is different from that at the other side.

A plurality of bent portions is arranged in each of the two terminals that are aligned in a direction perpendicular to a longitudinal direction and to which an electric signal converted by a magnetoelectric converter is output. The ridge line of each of the plurality of bent portions of one terminal is positioned on an extended line of a respective one of the ridge lines of the plurality of bent portions of the other terminal. A direction in which ends of the two terminals are aligned at one side is different from that at the other side.

By arranging the above-mentioned plurality of bent portions in each of the two terminals, regardless of the position of the magnetoelectric converter, the ends of the output side of the two terminals can be arranged at a desired position. Furthermore, the plurality of bent portions can be formed by simultaneously bending the two conductors, which are aligned in a direction perpendicular to the longitudinal direction, a plurality of times. If the bent portions are thus formed, the bent portions are formed by one-time bending and can easily be manufactured with a smaller number of bendings at a less expensive cost.

In the magnetic sensor, the respective ridge lines of the plurality of bent portions of the two terminals are diagonal to the longitudinal direction of the two terminals.

Because the respective ridge lines of the plurality of bent portions arranged in the two terminals are diagonal to the longitudinal direction of the two terminals, the two terminals occupy a small space and can be manufactured with a smaller number of bendings.

According to the method of manufacturing a terminal, the method of manufacturing two terminals for a magnetic sensor that performs a magnetoelectric conversion is provided with a step of simultaneously bending two conductors a plurality of times, such that a direction in which ends of the two conductors are aligned at one side is different from that at the other side and the two conductors are aligned in a direction perpendicular to a longitudinal direction.

For the two terminals used for a magnetic sensor that performs a magnetoelectric conversion, two conductors aligned in a direction perpendicular to the longitudinal direction are simultaneously bent. By bending the two conductors a plurality of times, they are adjusted such that the direction in which one end of the two conductors are aligned is different from the direction in which the other end of the two conductors are aligned.

The two bent portions are formed by one-time bending, so the two terminals to which an electric signal is output can easily be manufactured with a smaller number of bendings at a less expensive cost. Additionally, because the two conductors are bent such that the direction in which the ends of the two conductors are aligned on one side is different from that of the other side, two terminals can be manufactured in which the ends on the output side are arranged at a desired position regardless of the position of the magnetoelectric converter.

According to the method of manufacturing a terminal in the bending step, the two conductors are bent such that ridge lines of the bent portions formed by bending are diagonal to the longitudinal direction of the two conductors.

Because the two conductors are bent such that the ridge lines of the bent portions formed by bending are diagonal to the longitudinal direction of the two conductors, two compact terminals with a small occupied space can easily be manufactured with a smaller number of bendings. Furthermore, compared to the case in which the two terminals are manufactured by bending the two conductors individually, the two terminals in which a direction in which ends are aligned at one side is different from that at the other side can be manufactured by using two conductors whose material cost is less expensive and whose longitudinal direction length is short.

In a method of manufacturing a terminal, the two conductors are connected at one location or a plurality of locations, and a step of removing the portion or portions connecting the two conductors after the bending step is performed is further provided.

After the bending step is performed that bends the two conductors—which are connected to each other at one location or a plurality of locations—a plurality of times, the two terminals are manufactured by removing the portion or portions connected between the two conductors. Thus, the two conductors can be easily and accurately bent in the bending step.

Regardless of the position of the magnetoelectric converter, the ends of the output side of the two terminals can be arranged at a desired position and can be easily manufactured at a less expensive cost.

DETAILED DESCRIPTION OF THE EMBODIMENTS

Figure 1:
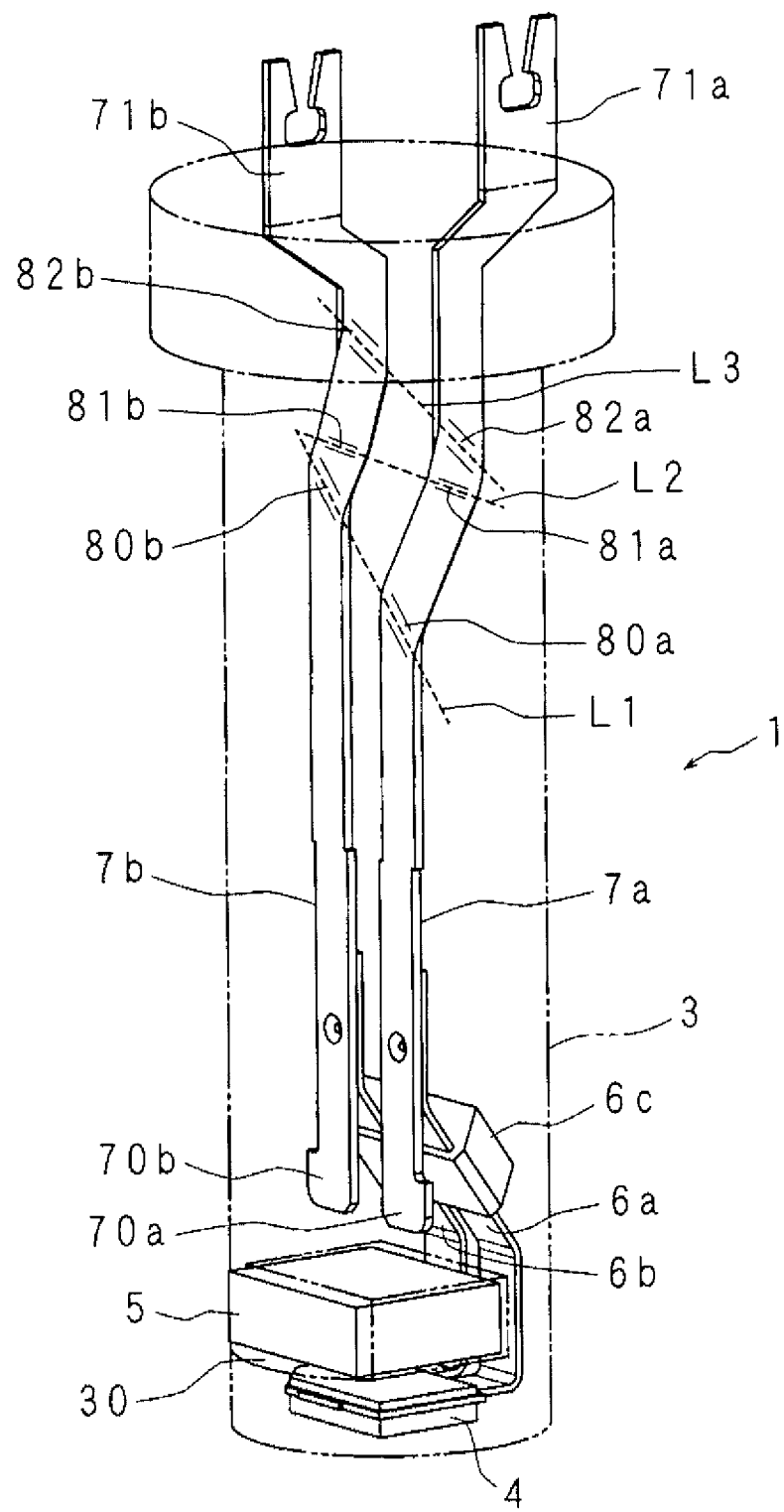
FIG. 1 is a perspective view of a magnetic sensor.
Figure 2:
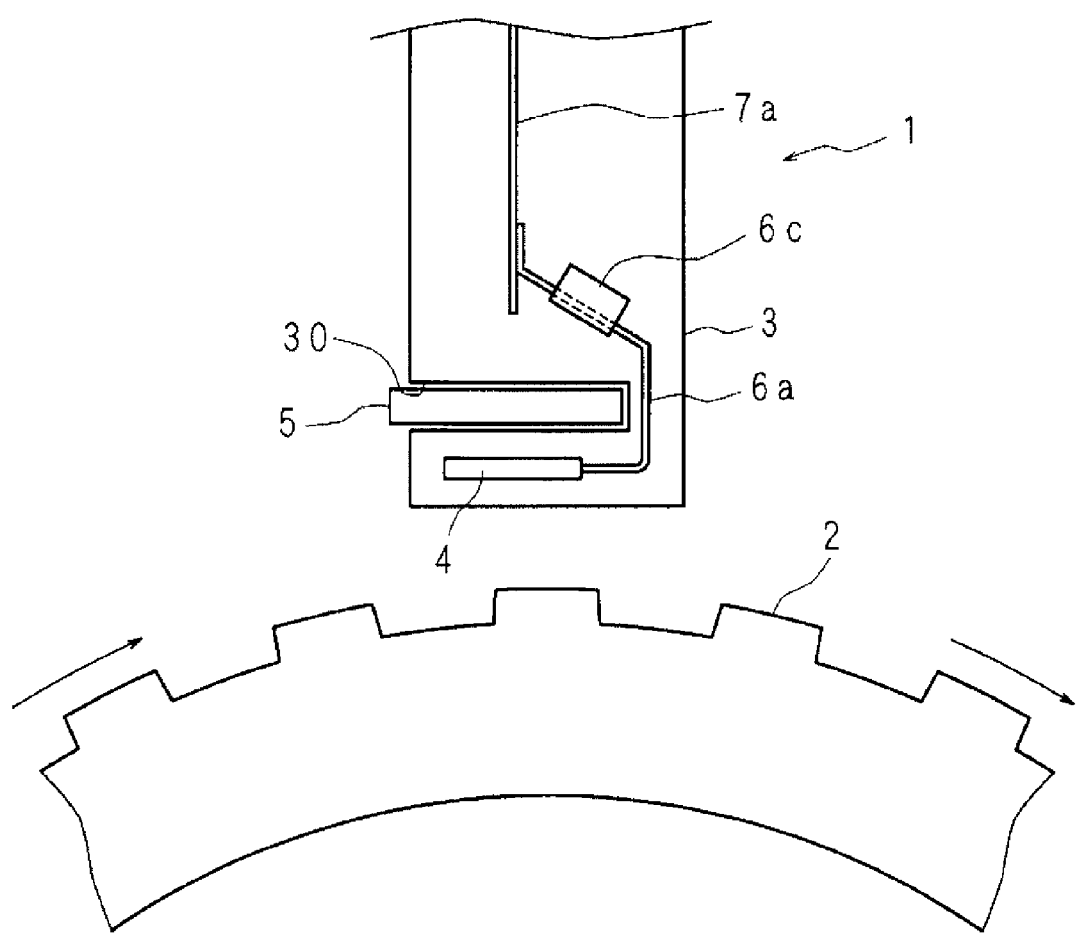
FIG. 2 is a view of a vertical cross section, which shows a partial structure of the magnetic sensor.

FIG. 1 is a perspective view of a magnetic sensor. FIG. 2 is a view of a vertical cross section, which shows a partial structure of the magnetic sensor. This magnetic sensor 1 is mounted on a vehicle. As shown in FIG. 2, the magnetic sensor 1 is arranged at a position facing an outer circumferential surface of an annular rotor 2, which is a magnetic body and rotates with an undepicted wheel. The magnetic sensor 1 generates a magnetic field toward the rotor 2, which has concavities and convexities on its outer circumferential surface, and outputs an electric signal according to the strength of the magnetic field that fluctuates due to the rotation of the rotor 2. The electric signal output by the magnetic sensor 1 is used to detect a rotation speed of the wheel.

The magnetic sensor 1 is provided with a cylindrical holder 3, of which one end surface formed of a resin faces the outer circumferential surface of the rotor 2. A plate-shaped magnetoelectric converter 4, a rectangular parallelepiped magnet 5, leads 6a, 6b, an electronic part 6c, and terminals 7a, 7b are arranged in the holder 3.

The magnetoelectric converter 4 is arranged at one end side of the holder 3 such that its plate surface is parallel to one end surface of the holder 3. The magnetoelectric converter 4 and the magnet 5 are aligned, in that order, along a direction from one end to the other end of the holder 3. A rectangular parallelepiped concave portion 30 whose dimensions, such as length, width, and height, are slightly larger than those of the magnetoelectric converter 4 is arranged on a circumferential surface of the holder 3. The magnet 5 is fit into the concave portion 30 from the outside of the holder 3.

The magnet 5 generates a magnetic field. The magnetic field generated by the magnet 5 permeates the magnetoelectric converter 4 and the rotor 2 and returns to the magnet 5. The rotor 2 has concavities and convexities on its outer circumferential surface. So if the rotor 2 is rotated with the wheel, the distance by which the magnetic field generated by the magnet 5 permeates the inside of the rotor 2 varies depending on the timing of those concavities and convexities. Because the magnetic permeability varies depending on the inside and the outside of the rotor 2, the strength of the magnetic field that permeates the plate surface of the magnetoelectric converter 4 fluctuates depending on the timing when the rotor 2 rotates.

The magnetoelectric converter 4 converts the magnetic field that permeates the plate surface of the magnetoelectric converter 4 to an electric signal according to the strength of the magnetic field. The electric signal converted by magnetoelectric converter 4 corresponds to the strength of the magnetic field that permeates the magnetoelectric converter 4, in other words the rotation speed of the rotor 2. Thus, the rotation speed of the wheel that rotates with the rotor 2 can be detected from the electric signal converted by the magnetoelectric converter 4.

The magnetoelectric converter 4 is connected to ends of the respective rectangular-plate-shaped leads 6a, 6b. The leads 6a, 6b each have a plurality of bent portions and are aligned in a width direction. Within the holder 3, the terminals 7a, 7b are each arranged more toward the other end of the holder 3 than the magnet 5, are rectangular-plate-shaped, and are aligned in a direction perpendicular to a longitudinal direction, in other words in a width direction. The longitudinal direction of the terminals 7a, 7b, and the holder 3 substantially matches each other, and the other ends of the respective leads 6a, 6b are connected to the ends 70a, 70b of the terminals 7a, 7b. The magnetic sensor 1 outputs the electric signal converted by the magnetoelectric converter 4 from the ends 71a, 71b of the respective terminals 7a, 7b, which protrude from the other end surface of the holder 3.

The electronic part 6c, which includes a capacitor, is connected between the leads 6a, 6b. The electronic part 6c, for example, removes noise of the electric signal converted by the magnetoelectric converter 4. Excluding the concave portion 30, resin fills the inside of the holder 3. The magnetoelectric converter 4, the leads 6a, 6b, the electronic part 6c, and the terminals 7a, 7b—excluding the ends 71a, 71b—are covered with resin.

The ends 70a, 70b are arranged on one end side of the holder 3. The terminal 7a is provided with bent portions 80a, 81a, 82a between the ends 70a and 71a. The terminal 7b is provided with the bent portions 80b, 81b, and 82b between the ends 70b and 71b.

Furthermore, because the bent portions 80a, 80b, 81a, 81b, 82a, 82b are arranged in the terminals 7a, 7b, the direction in which the ends 70a, 70b of the terminals 7a, 7b are aligned at one side is different from the direction in which the ends 71a, 71b of the terminals 7a, 7b are aligned at the other side.

Furthermore, the respective ridge lines of the bent portions 80a, 81a, 82a are positioned on extended lines of the ridge lines of the bent portions 80b, 81b, 82b. In FIG. 1, a straight line L1 is a straight line along the respective ridge lines of the bent portions 80a, 80b, a straight line L2 is a straight line along the respective ridge lines of the bent portions 81a, 81b, and a straight line L3 is a straight line along the respective ridge lines of the bent portions 82a, 82b.

Thus, a ridge line of each of the plurality of bent portions 80a, 81a, 82a of the terminal 7a is positioned on an extended line of a respective one of the ridge lines of the plurality of bent portions 80b, 81b, 82b of the terminal 7b. In the same manner, a ridge line of each of the plurality of bent portions 80b, 81b, 82b of the terminal 7b is positioned on an extended line of a respective one of the ridge lines of the plurality of bent portions 80a, 81a, 82a of the terminal 7a.

Furthermore, the ridge lines of the bent portions 80a, 80b, 81a, 81b, 82a, 82b of the terminals 7a, 7b, in other words the respective straight lines L1, L2, L3, are diagonal to the longitudinal direction of the terminals 7a, 7b.

Thus, by having the bent portions 80a, 80b, 81a, 81b, 82a, 82b, the ends 71a, 71b of the terminals 7a, 7b that output an electric signal converted by the magnetoelectric converter 4 can be arranged at a desired position regardless of the position of the magnetoelectric converter 4. Additionally, the respective straight lines L1, L2, L3 are diagonal to the longitudinal direction of the terminals 7a, 7b. So the space occupied by the terminals 7a, 7b is small, and the terminals 7a, 7b are compact.

Figure 3:
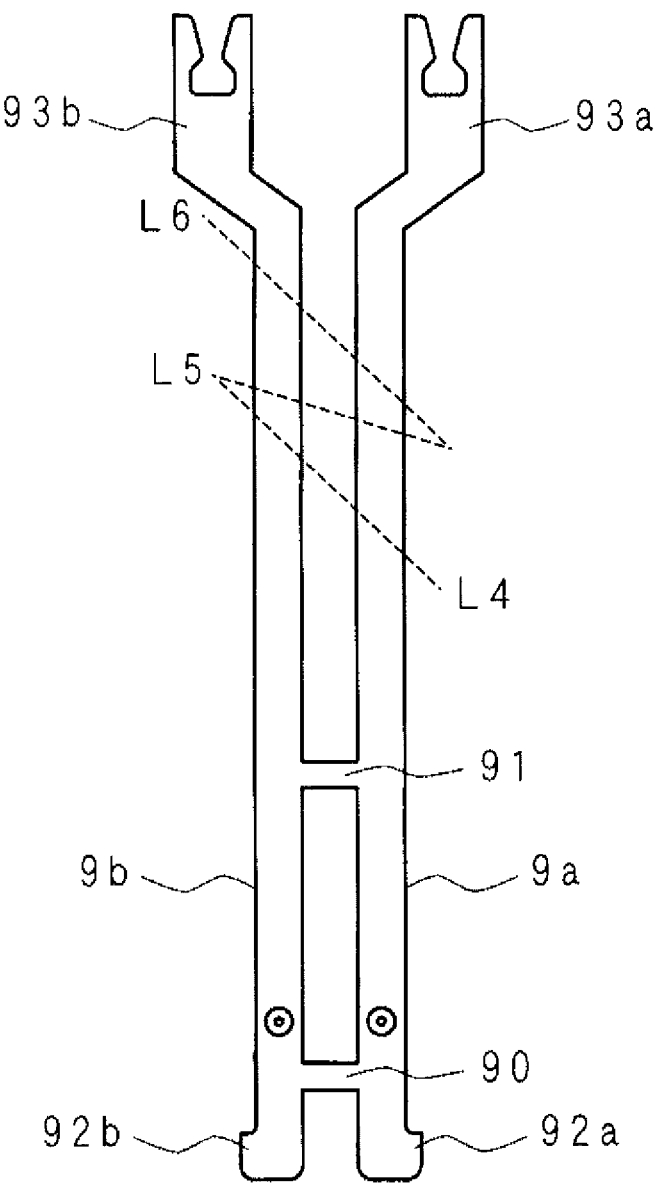
FIG. 3 is an explanatory view explaining a method of manufacturing a terminal.

Next, a method of manufacturing the terminals 7a, 7b used for the magnetic sensor 1 that performs magnetoelectric conversion is described. FIG. 3 is an explanatory view explaining a method of manufacturing the terminals 7a, 7b. FIG. 3 shows a front view of conductors 9a, 9b that are respectively rectangular-plate-shaped and are aligned in a direction perpendicular to the longitudinal direction, in other words in a width direction. The lengths of the conductors 9a, 9b in the longitudinal direction are substantially the same, and the conductors 9a, 9b are connected by connecting portions 90, 91 in two places.

In the respective conductors 9a, 9b, the connecting portions 90, 91 are arranged more toward the ends 92a, 92b than at the longitudinal center. The respective bent portions 80a, 80b, 81a, 81b, 82a, 82b are formed more toward the other ends 93a, 93b than at the longitudinal center by a step of simultaneously bending the conductors 9a, 9b a plurality of times in a direction perpendicular to the plate surface.

Specifically, the bent portions 80a, 80b, 81a, 81b, 82a, 82b are formed by bending the conductors 9a, 9b in a direction perpendicular to the plate surface of the conductors 9a, 9b, along the straight lines L4, L5, L6 that are imaginarily drawn on the plate surface of the conductors 9a, 9b diagonally to the longitudinal direction.

In the two conductors 9a, 9b, the respective straight lines L4, L5, L6 are the straight lines that are drawn from the end 93b side to the end 92a side. The angles formed by the longitudinal direction of the conductors 9a, 9b and the straight lines L4, L6 are more acute than the angle formed by the longitudinal direction of the conductors 9a, 9b and the straight line L5.

Figure 4:
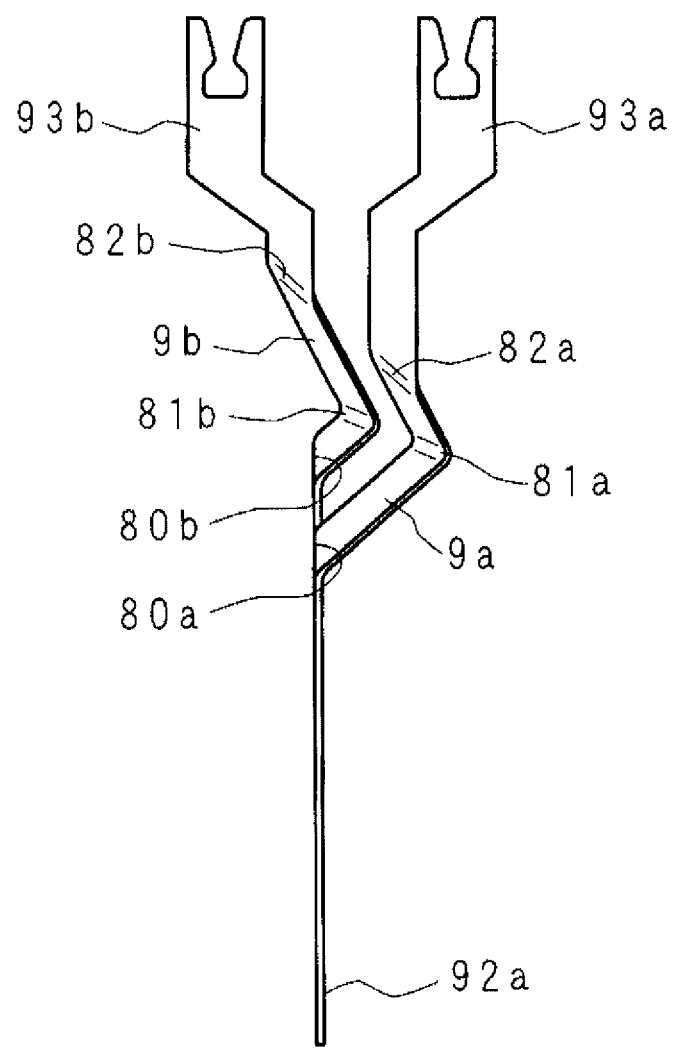
FIG. 4 is a front view of a bent conductor.
Figure 5:
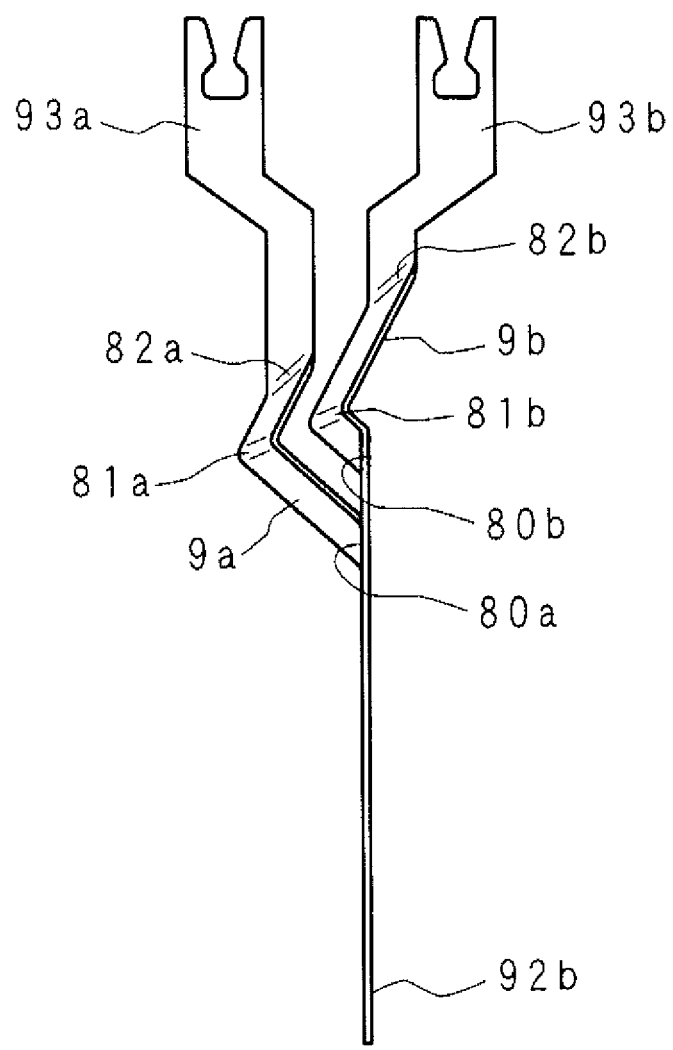
FIG. 5 is a rear view of the bent conductor.
Figure 6:
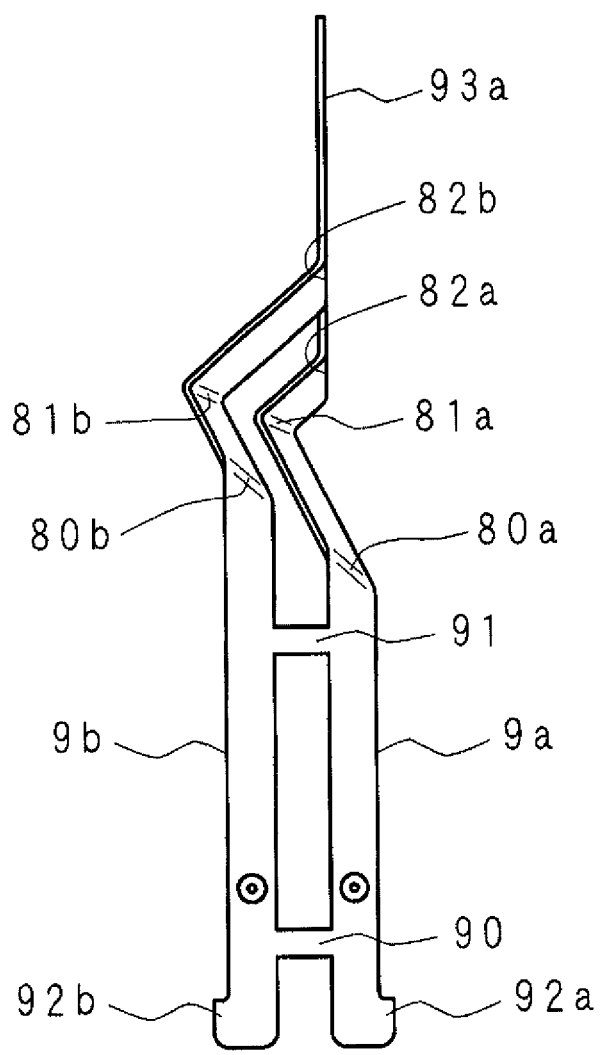
FIG. 6 is a left side view of the bent conductor.

FIGS. 4, 5, and 6 are respectively a front view, a rear view, and a left side view of the bent conductors 9a, 9b. In the bending step, the terminals 7a, 7b are manufactured by bending the conductors 9a, 9b three times. The conductors 9a, 9b are bent by, for example, a press machine.

In one bending, the conductors 9a, 9b are simultaneously bent such that the straight line L4 shown in FIG. 3 is located outward. In other words, the conductors 9a, 9b along the straight line L4 are simultaneously bent in an inverted V shape. By so doing, as shown in FIGS. 4, 5, and 6, the bent portions 80a, 80b are formed, and the respective ridge lines of the bent portions 80a, 80b are diagonal to the longitudinal direction of the two conductors 9a, 9b.

In another bending, the conductors 9a, 9b are simultaneously bent such that the line L5 shown in FIG. 3 is located inward. In other words, the conductors 9a, 9b along the line L5 are simultaneously bent in a V shape. Thus, as shown in FIGS. 4, 5, and 6, the bent portions 81a, 81b are formed, and the respective ridge lines of the bent portions 81a, 81b are diagonal to the longitudinal direction of the conductors 9a, 9b.

In another bending, the conductors 9a, 9b are simultaneously bent such that the straight line L6 shown in FIG. 3 is located outward. In other words, the conductors 9a, 9b along the straight line L6 are bent in an inverted V shape. By so doing, as shown in FIGS. 4, 5, and 6, the bent portions 82a, 82b are formed, and the respective ridge lines of the bent portions 82a, 82b are diagonal to the longitudinal direction of the two conductors 9a, 9b.

In the above bending step, the two conductors 9a, 9b are bent such that the respective ridge lines of the bent portions 80a, 80b, 81a, 81b, 82a, 82b formed by bending are diagonal to the longitudinal direction of the two conductors 9a, 9b.

In the bending step, the conductors 9a, 9b are bent such that the direction in which the ends 92a, 92b of the conductors 9a, 9b are aligned at one end is different from the direction in which the ends 93a, 93b are aligned at the other end.

In the conductors 9a, 9b on which the bending step is performed, as shown in FIGS. 4, 5, and 6, the direction in which the ends 93a, 93b are aligned is different by 90 degrees from the direction in which the ends 92a, 92b are aligned.

After the above-explained bending step is performed, the terminals 7a, 7b shown in FIG. 1 are manufactured by performing a step of removing the respective connecting portions 90, 91. Here, the respective ends 92a, 92b of the conductors 9a, 9b correspond to the ends 70a, 70b of the terminals 7a, 7b, and the respective ends 93a, 93b of the conductors 9a, 9b correspond to the ends 71a, 71b of the terminals 7a, 7b.

By changing (i) the angle formed by the respective straight lines L1, L2, L3 with respect to the longitudinal direction of the conductors 9a, 9b and (ii) the angle of the conductors 9a, 9b being bent in the direction perpendicular to the plate surface of the conductors 9a, 9b, the direction in which the ends 93a, 93b are aligned with respect to the direction in which the ends 92a, 92b are aligned can be adjusted to an angle other than 90 degrees.

By also changing the way that the conductors 9a, 9b are bent, from a V shape to an inverted V shape, or from an inverted V shape to a V shape, the direction in which the ends 92a, 92b are aligned can be adjusted to an angle other than 90 degrees with respect to the direction in which the ends 93a, 93b are aligned.

Thus, the ends 71a, 71b from which the magnetoelectric converter 4 outputs a conversion signal can be arranged at a desired position regardless of the position of the ends 70a, 70b, in other words the position of the magnetoelectric converter 4.

Thus, by bending the conductors 9a, 9b three times, the terminals 7a, 7b can be manufactured where the direction in which the ends 71a, 71b are aligned is different from the direction in which the ends 71a, 71b are aligned.

By bending the two conductors individually, at least six bendings would be needed when the two terminals are manufactured in which the direction in which two ends are aligned at one end is different from the direction in which two ends are aligned at the other end.

In this embodiment, the bent portions 80a, 80b, the bent portions 81a, 81b, or the bent portions 82a, 82b are formed by bending the two conductors one time. Thus, the terminals 7a, 7b can easily be manufactured with a smaller number of bendings of the terminals 7a, 7b at a reduced cost, and the magnetic sensor 1 that is provided with the terminals 7a, 7b can easily be manufactured at a reduced cost.

By bending the conductors 9a, 9b such that the ridge lines of the bent portions 80a, 80b, 81a, 81b, 82a, 82b formed by bending are diagonal to the longitudinal direction of the conductors 9a, 9b, the compact terminals 7a, 7b that occupy a small space can be manufactured with a smaller number of bendings of the terminals. Therefore, the magnetic sensor 1 with the terminals 7a, 7b is also compact, and the magnetic sensor 1 is preferable as a magnetic sensor arranged in a vehicle that has many electronic devices and that has a limited vacant space.

In this embodiment, the two terminals in which a direction in which ends are aligned at one side is different from a direction at the other side can be manufactured by using the two conductors whose material cost is less expensive and whose longitudinal direction length is short compared to the case in which the two terminals are manufactured by bending the two conductors individually.

Furthermore, the conductors 9a, 9b are connected by the connecting portions 90, 91. So the conductors 9a, 9b can be easily and accurately bent in the bending step.

Additionally, it is acceptable if not all of the ridge lines of the bent portions 80a, 80b, 81a, 81b, 82a, 82b are diagonal to the longitudinal direction of the terminals 7a, 7b. Bent portions in which the ridge lines match or are perpendicular to the longitudinal direction of the terminals 7a, 7b may be included in the bent portions 80a, 80b, 81a, 81b, 82a, 82b.

In the bending step, it is acceptable if the conductors 9a, 9b are not, with respect to all the bendings, bent such that the ridge lines of the bent portions formed by bending are diagonal to the longitudinal direction of the conductors 9a, 9b. For example, straight lines perpendicular to the longitudinal direction of the conductors 9a, 9b may also be included in the straight lines L1, L2, L3.

Furthermore, the connecting portions 90, 91 may not need to be arranged toward the ends 92a, 92b from the longitudinal center of the conductors 9a, 9b. For example, they may be arranged toward the ends 93a, 93b from the longitudinal center of the conductors 9a, 9b. Additionally, the number of the portions that connect between the conductors 9a, 9b is not limited to two. The number of the connecting portions may be one, or three or more.

It is acceptable if connecting portions are not arranged between the conductors 9a, 9b. The terminals 7a, 7b may be manufactured by simultaneously bending the conductors 9a, 9b that are not connected to each other a plurality of times.

Furthermore, the number of bent portions of the respective terminals 7a, 7b need not be three, but may be four or more. Thus, the number of times in which the conductors 9a, 9b are bent in the bending step is not limited to three, but may be four or more.

The shape of the terminals 7a, 7b and the conductors 9a, 9b need not be a rectangular-plate-shape, but may be, for example, a bar shape.

It should be considered that the disclosed embodiment is an example in all aspects and is not limiting.

What is claimed is:

1. A magnetic sensor in which an electric signal converted by a magnetoelectric converter is output from two terminals aligned in a direction perpendicular to a longitudinal direction comprising:

each of the two terminals has a plurality of bent portions, each of the plurality of bent portions defines a ridge line, the ridge line of each of the plurality of bent portions of one terminal is positioned on an extended line of the respective one of the ridge lines of the plurality of bent portions of the other terminal, and a direction in which ends of the two terminals are aligned at one side is different from that at the other side.

2. The magnetic sensor as set forth in claim 1, wherein the respective ridge lines of the plurality of bent portions of the two terminals are diagonal to the longitudinal direction of the two terminals.

3. A method of manufacturing two terminals for a magnetic sensor that performs magnetoelectric conversion, comprising:

simultaneously bending two conductors a plurality of times such that a direction in which ends of the two conductors are aligned at one end is different from that at the other end, the two conductors being aligned in a direction perpendicular to a longitudinal direction.

4. The method of manufacturing a terminal as set forth in claim 3, wherein in the bending step, the two conductors are bent such that ridge lines of the bent portions formed by bending are diagonal to the longitudinal direction of the two conductors.

5. The method of manufacturing a terminal as set forth in claim 3, wherein the two conductors are connected at one location or a plurality of locations, and removing a portion connecting the two conductors after the bending step is performed.

6. A magnetic sensor comprising:

a first terminal having a first end, a second end, and a plurality of bent portions between the first end and the second end; and a second terminal having a first end, a second end, and a plurality of bent portions between the first end and the second end, the second terminal being disposed in a direction parallel to the first terminal, wherein the first end of each of the first and second terminals is connected to a magnetoelectric converter, the second end of each of the first and second terminals is configured to be adaptable to a plurality of different positions, each of the plurality of bent portions defines a ridge line, and the ridge line of each of the plurality of bent portions of the first terminal is positioned on an extended line of the respective one of the ridge lines of the plurality of bent portions of the second terminal.

7. The magnetic sensor as set forth in claim 6, wherein the respective ridge lines of the plurality of bent portions of the first and second terminals are diagonal to the longitudinal direction of the first and second terminals.

* * * * *